United States Patent
Chang

(10) Patent No.: US 6,670,304 B2
(45) Date of Patent: *Dec. 30, 2003

(54) ENHANCED FUNCTIONALIZED CARBON MOLECULAR SIEVES FOR SIMULTANEOUS $CO_2$ AND WATER REMOVAL FROM AIR

(75) Inventor: Chin-Hsiung Chang, Palatine, IL (US)

(73) Assignee: Honeywell International Inc., Morristown, NJ (US)

( * ) Notice: Subject to any disclaimer, the term of this patent is extended or adjusted under 35 U.S.C. 154(b) by 208 days.

This patent is subject to a terminal disclaimer.

(21) Appl. No.: 09/770,731

(22) Filed: Jan. 24, 2001

(65) Prior Publication Data

US 2002/0025290 A1 Feb. 28, 2002

Related U.S. Application Data

(63) Continuation-in-part of application No. 09/261,046, filed on Mar. 2, 1999, now Pat. No. 6,294,501.
(60) Provisional application No. 60/077,491, filed on Mar. 11, 1998, and provisional application No. 60/077,253, filed on Mar. 9, 1998.

(51) Int. Cl.[7] ............................................... C01B 31/08
(52) U.S. Cl. ....................................... 502/418; 502/416
(58) Field of Search ....................... 423/445 R; 502/416, 502/418

(56) References Cited

U.S. PATENT DOCUMENTS

| | | | |
|---|---|---|---|
| 4,249,915 A | | 2/1981 | Sircar et al. |
| 4,614,186 A | | 9/1986 | John |
| 4,702,749 A | * | 10/1987 | Sircar et al. ................. 502/416 |
| 4,810,266 A | | 3/1989 | Zinnen et al. |
| 4,820,681 A | | 4/1989 | Chang et al. |
| 5,417,947 A | | 5/1995 | Hertl et al. |
| 5,716,899 A | | 2/1998 | Guile et al. |
| 5,876,488 A | | 3/1999 | Birbara et al. |
| 6,113,673 A | | 9/2000 | Loutfy et al. .................. 95/116 |
| 6,294,501 B1 | * | 9/2001 | Cowden ..................... 502/418 |

FOREIGN PATENT DOCUMENTS

GB    1157376    7/1969

* cited by examiner

*Primary Examiner*—Stuart L. Hendrickson
(74) *Attorney, Agent, or Firm*—Oral Caglar, Esq.

(57) ABSTRACT

A carbon dioxide and water adsorbent comprises a carbonized and activated precursor material having first functional sites that adsorb carbon dioxide and second functional sites that adsorb water independently of the first functional sites. The adsorbent is characterized by a total pore volume of between about 1.50 to 2.50 $cm^3/g$, a median pore diameter between about 0.5 to 1.2 nm, and a BET surface area between about 2000 to 2500 $m^2/g$.

26 Claims, 11 Drawing Sheets

US 6,670,304 B2

ENHANCED FUNCTIONALIZED CARBON MOLECULAR SIEVES FOR SIMULTANEOUS $CO_2$ AND WATER REMOVAL FROM AIR

CROSS-REFERENCE TO RELATED APPLICATIONS

The present application claims the benefit of U.S. Provisional Application Nos. 60/077,253 and 60/077,491, respectively filed Mar. 9, 1998 and Mar. 11, 1998. This application is also a continuation-in-part of U.S. application Ser. No. 09/261,046 filed Mar. 2, 1999 now U.S. Pat. No. 6,294,501.

BACKGROUND OF THE INVENTION

The present invention generally relates to adsorbents for carbon dioxide and water and, more specifically, to an improved adsorbent for the simultaneous removal of carbon dioxide and water from air and that can be regenerated with heat and/or vacuum.

Carbon dioxide is produced from biological processes, combustion of fossil fuels, and from other industrial processes. For the maintenance of human life—especially in space exploration, underwater activities, and underground mining activities—the control of the concentration of carbon dioxide is critically important. In addition, carbon dioxide has been identified as one of the global warming gases. As such, the control and utilization of carbon dioxide is an important technology requirement for protecting the global environment.

Conventional adsorbents for the adsorption of carbon dioxide are zeolite materials such as 13X and 5A. For the use of these adsorbents, a 4-bed unit has been designed. Two beds are used for the removal of humidity in the air before the dry air stream is contacted with the zeolite adsorbent for carbon dioxide removal. These adsorbent materials are inorganic oxides that also adsorb water; however, the adsorption of water simultaneously diminishes the capability of the zeolite for carbon dioxide adsorption. In addition, the binding energy of carbon dioxide on the zeolite is high. Consequently, a high temperature of about 523° K is needed to remove the carbon dioxide from the adsorbent.

In an effort to overcome disadvantages presented by a zeolite adsorbent, carbon-based materials have been used. For example, in U.S. Pat. No. 4,820,681 which is assigned to the assignee of the present invention, a carbon molecular sieve was prepared by polymerizing a cross-linking agent and a precursor monomer to produce a cross-linked polymer. The cross-linked polymer was then shaped into a desired configuration without the need for a binder. The shaped polymer was then carbonized.

In a fashion related to the above patent, U.S. Pat. No. 4,810,266 which is also assigned to the assignee of the present invention discloses a carbon molecular sieve. The sieve is similarly prepared by polymerizing a cross-linking agent and precursor monomer. The cross-linked polymer that is produced was also shaped into a desired configuration and carbonized. The pores of the material were then enlarged by steam treatment. And the material was given an amine functionality that improved capacity upon regeneration of the material by heating.

While the above art has provided advantages, it has not adequately addressed the importance of adsorbent characteristics such as pore size, micropore volume, pore size distribution, surface hydrophilicity, and surface functionality. These characteristics are important because carbon dioxide adsorption on solid adsorbents is based on the interaction forces between the gaseous molecule and the surfaces on micropores in the adsorbent.

As can be seen, there is a need for an improved adsorbent for carbon dioxide and water from air that overcomes disadvantages of the prior art.

SUMMARY OF THE INVENTION

In one aspect of the present invention, a carbon dioxide and water adsorbent comprises a carbonized, activated, and functionalized carbon material having first functional sites that adsorb carbon dioxide and second functional sites that adsorb water, whereby the adsorbent is characterized by a total pore volume of between about 1.5 to 2.5 $cm^3/g$, a median pore diameter between about 0.5 to 1.2 nm, and a BET surface area between about 2000 to 2500 $m^2/g$.

In another aspect of the present invention, a method of making a carbon dioxide and water adsorbent comprises polymerizing a monomer to produce a precursor material; carbonizing the precursor material to produce a carbonized precursor material; activating the carbonized precursor material to produce an activated precursor material; functionalizing the activated carbon precursor material to produce a functionalized carbon material having functional sites that adsorb carbon dioxide independently of adsorbing water; whereby the adsorbent is characterized by a carbon dioxide adsorption capacity between about 4.0 to 6.0 wt./wt. %, as well as a water adsorption capacity between about 10 to 30 wt./wt. %, at a vapor pressure of $CO_2$ at about 3.8 Torr and a water vapor pressure of about 25 Torr, and a temperature of about 25° C.

These and other features, aspects and advantages of the present invention will become better understood with reference to the following drawings, description and claims.

DETAILED DESCRIPTION OF THE INVENTION

Figure 1:
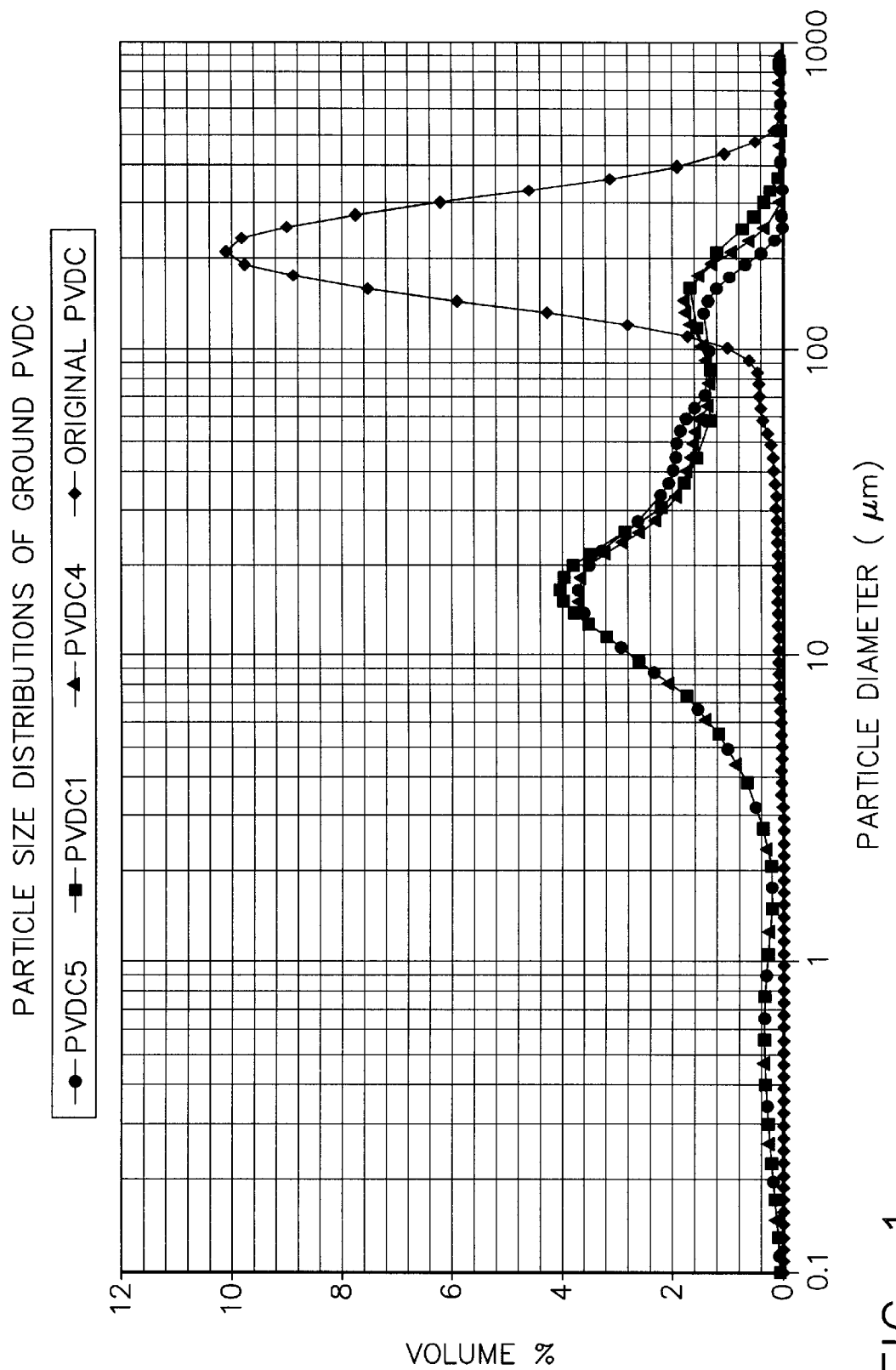
FIG. 1 is a graph of volume % versus particle diameter for precursor material in accordance with the present invention.

The present invention can be for various environments, such as those where the atmospheric gases include nitrogen, water, and oxygen. For example, it may be desirable to remove carbon dioxide and water from enclosed life support systems or vehicles such as submarines, aircraft, and spacecraft. The need to remove carbon dioxide and water from a gas can also be due to the dictates of industrial or chemical processes that require low levels of carbon dioxide and/or water. Therefore, the present invention can be useful in generating high-purity oxygen for use in a chemical reaction or analysis.

In general, the present invention provides a carbon dioxide and water adsorbent in the form of functionalized and activated carbon molecular sieves (CMS). The CMS may be thought of as an analog to conventional inorganic molecular sieves and is selective for the separation of one normally gaseous compound or molecule from another. In contrast to the prior art, the adsorbent of the present invention is characterized by, among other things, a total pore volume between about 1.5 to 2.5 $cm^3/g$, a median pore diameter between about 0.5 to 1.2 nm, a BET surface area between about 2000 to 2500 $m^2/g$, and functional sites that adsorb carbon dioxide independently of adsorbing water.

A method of making the adsorbent of the present invention may be accomplished by the steps of (1) synthesizing a precursor material by polymerizing an oxygen-free monomer—whether in the presence or absence of an oxygen-free cross-linking agent; (2) optionally forming or shaping particles of the precursor material into a desired shape in the absence of a binder; (3) carbonizing the shaped material in a substantially oxygen-free environment; (4) activating the carbonized precursor material such as by steam and an elevated temperature; and (5) functionalizing the activated precursor material such as by contact with an amine to produce functional sites that adsorb carbon dioxide independently of adsorbing water.

The foregoing is in contrast to the prior art wherein an adsorbent adsorbs either carbon dioxide or water, but not both. In other words, carbon dioxide and water compete with one another for adsorption by any one functional site of the prior art adsorbent. Also in contrast to the prior art, the method of the present invention involves a 3-step activation process that achieves an advantageous pore size and pore distribution that provide maximum effective pore surfaces for the incorporation of functionalities that adsorb not only $CO_2$ but water vapor independently.

In more specifically describing the steps or acts of the present invention, the monomer used in the synthesizing step may be chosen from a number of different monomers that have characteristics rendering them suitable for the present method. Basically, the monomers should be readily polymerizable, essentially free of oxygen in their molecular structure, and preferably comprised basically of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other suitable monomers include vinyl fluoride, vinyl bromide, chlorinated ethylene, chlorofluorinated ethylene, vinyl-chlorobenzene, vinylidene bromide and vinylidene-fluoride-chlorotrifluoroethylene. The preferred monomer for utilization in the present invention is vinylidene chloride because of its capability to produce precursor material that forms desirable CMS upon carbonization.

The step or act of polymerizing in the present invention may be performed according to a number of different procedures known in the art. The various types of polymerization referenced herein are defined in accordance with Volume 16 of the Second Edition of the *Kirk-Othmer Encyclopedia of Chemical Technology*. For "suspension polymerization," a monomer is dispersed rather than dissolved in a medium with water being the typical suspension medium. In suspension polymerization, an initiator is dissolved in the monomer, the monomer is dispersed in water, and a dispersing agent is incorporated to stabilize the suspension formed. The monomer droplets are generally on the order of approximately 0.1–1.0 mm in size. In "emulsion polymerization," the polymerization is within a suspended particle of colloidal size of approximately 50 to 1500 Angstroms in diameter. An initiator is normally found in the aqueous phase and not within the monomer.

"Bulk polymerization" is the direct conversion of liquid monomer to polymer in a reaction system in which the polymer remains soluble in its own monomer. To deal with the problems of removing the exothermic heat of polymerization, this type of polymerization is often terminated at relatively low conversions of 40–60% and excess monomer distilled off for use in subsequent polymerization. "Solution polymerization" is where a solvent is used to dissolve the monomer, the polymer, and a polymerization initiator. It is believed that precipitation polymerization and vapor phase polymerization would also be suitable for the subject invention. Preferably, suspension polymerization is used in the present invention because of its relative ease in the control of final precursor particle size, density and other characteristics.

Since it is desired that the produced polymers have a non-oxygen functionality, the polymerization initiator used in the suspension polymerization is preferably an oxygen-free compound. Therefore, a carbon or azo compound—rather than an oxygen-containing initiator—is preferably used. One suitable initiator is 2,2'-azobisisobutyronitrile (AIBN) which has a molecular formula of $C_8H_{12}N_4$. Lauroyl peroxide is also useful. Another suitable polymerization initiator is 2,2'-azobis (2,4-dimethylvaleronitrile) which is available from DuPont Chemical Company and sold under the trade name VAZO 52. The formula of the latter compound is $C_{14}H_{24}N_4$.

If the precursor polymer is produced by solution polymerization, a number of different solvents may be employed. Desired characteristics in the solvent include a high-solubility for the monomer, the absence of oxygen from the molecular structure, and a large difference in boiling point between the solvent and the monomer. Useful solvents include normal hexane, chloroform, carbon tetrachloride, orthodichlorobenzene, and 1,1,2,2,-tetrachloroethane. A weight ratio between monomer and solvent of about 1:1 to 1:2 will normally be suitable.

The preferred suspension polymerization may be carried out in an aqueous solution containing one or more of various dispersing agents such as hydroxypropyl cellulose and hydroxypropyl methyl cellulose. With (AIBN) or lauroyl peroxide being the preferred initiator, the polymerization reaction should be controlled by temperature and agitation at 70–100 rpm to achieve a desired particle size and particle density of the resulting polyvinylidene chloride (PVDC). For example, if AIBN is used, reactor temperature may be increased to about 70° C. and reaction time may be about 8 hours. Thereby, a product yield of about 65% can be obtained. The particle size can be about 200 to 800 micrometers.

With suspension polymerization, several heating steps may preferably be employed, such as: (1) heating the reactor temperature from about 25 to about 50° C. over a period of about 2 to 4 hours; (2) maintaining the reactor temperature at about 50 to 52° C. for about 10 to 13 hours; (3) increasing the temperature to about 55 to 58° C. over about 25 to 30 minutes; (4) maintaining the temperature at about 57 to 59° C. for about 5.0 to 5.5 hours; (5) increasing the temperature to about 63 to 65° C. over about 25 to 30 minutes; (6) maintaining the temperature at about 63 to 65° C. for about 2.0 to 2.5 hours; (7) increasing the temperature to about 68 to 72° C. over about 25 to 30 minutes; and (8) maintaining the temperature at about 68 to 72° C. for about 1.0 to 1.5 hours. More preferably, and with the use of lauroyl peroxide as the initiator, the heating steps may include: (1) heating the reactor temperature from about 25 to about 51° C. over a period of about 2 to 4 hours; (2) maintaining the reactor temperature at about 51° C. for about 13 hours; (3) increasing the temperature to about 58° C. over about 30 minutes; (4) maintaining the temperature at about 58° C. for about 5.5 hours; (5) increasing the temperature to about 64° C. over about 30 minutes; (6) maintaining the temperature at about 64° C. for about 2.5 hours; (7) increasing the temperature to about 70° C. over about 30 minutes; and (8) maintaining the temperature at about 70° C. for about 1.5 hours.

Using the above procedure for lauroyl peroxide, a product yield >96% can be obtained. The resulting PVDC polymer may then be washed and dried at about 80° C. A particle size of about 20–400 micrometers can be obtained, as shown in FIG. 1. Therein, "original pvdc" refers to the particle size distribution from product produced with the above procedure, "pvdc1" refers to the particle size distribution of PVDC produced after grinding the original particle with a commercial blender, and "pvdc4" and "pvdc5" refer to the reproducible grinding process that was repeated twice.

Optionally, the polymers produced in the polymerization step may be cross-linked with a substantially oxygen-free cross-linking agent. The cross-linking agent may typically be present during polymerization at a concentration equal to less than about 10 mole percent of the monomer. A preferred cross-linking agent is divinylbenzene. Other cross-linking agents which are contemplated for use in the present method include trivinyl benzene, divinyl acetylene, and divinyl sulfide.

Whether cross-linked or not, the precursor material formed during the polymerization step may be in a number of different forms, such as one or more large masses or a large number of smaller particles. For ease in fabricating the polymer into a desired shape, the polymer may preferably be ground, pulverized, shredded, or in some way reduced in size to small free-flowing granules or powder. The granules or powder—or even the bulk material resulting from the initial polymerization—may then be shaped or formed into a desired configuration such as a cylinder, sphere, rod, flat sheet, porous or perforated sheet, extruded honeycomb or monolith, pellets, etc. In this embodiment, pellets are preferred. This shaping or forming may be done by conventional means. For instance, the powder may be put into a press and pressurized until it will retain a desired shape. Alternatively, the resultant material may be warmed and extruded into a desired form, such as a cylinder.

Preferably, the precursor material in the form of particles resulting from the suspension polymerization is ground. Grinding may be conducted with dried powder or in a water suspension. The later method is preferred due to the ability of water to serve as a heat sink and to reduce the rise in temperature during grinding. Ice may be added to the suspension in order to further reduce the temperature. Next, it is preferred that the polymer particles of about 4 to 100 micrometers be selected because of ease in fabricating into a desired shape without excessive pressures.

The selected particles may then be pelletized with a commercial pelletization unit without any pelletization aid to hold particles together. A pellet of about 0.1 to 0.2 inches in diameter and about 0.1 to 0.3 inches in length is desired, preferably about 0.1 to 0.15 inches in diameter and about 0.1 to 0.2 in length, and more preferably about 0.12 to 0.13 inches in diameter and about 0.12 to 0.13 in length. Consequently, a length to diameter ratio is desired between about 1.0 to 1.5, preferably about 1.0 to 1.2, and more preferably about 1.0 to 1.1.

A preferred length to diameter ratio can be advantageous due to needs in placing the final adsorbent with high packing density and low pressure drop in a bed, for example. Because of the requirement to achieve high packing density for the resulting adsorbent, a preferred pellet density is desired between about 1.0 to 1.6 g/cm$^3$, preferably about 1.0 to 1.4 g/cm$^3$, and more preferably about 1.0 to 1.2 g/cm$^3$. The pellet density may be controlled by adjusting the amount of powder and/or a pelletization pressure.

If in a shaped form—whether in pellets or otherwise—the shaped precursor material may desirably be between about 0.02 to 0.05 grams, preferably between about 0.025 to 0.04 grams, and more preferably between about 0.03 to 0.035 grams. The weight of the shaped precursor material can be important due to the need for producing carbonized adsorbent with the highest density while maintaining an optimum pore size and pore size distribution.

The shaped or unshaped precursor material may then subjected to a carbonization procedure. The carbonization temperature—as well as the precursor material particle size, particle size distribution, and piece density—determine the final CMS pore size, pore size distribution, and mechanical strength. This carbonization procedure may basically include heating the precursor material in a stepped fashion to a high temperature in the presence of an inert gas such as nitrogen or helium. This carbonization may be performed in an essentially oxygen-free environment. That is, the concentration of oxygen in the atmosphere surrounding the particles undergoing carbonization should be less than about 0.1 mole percent and preferably less than about 0.05 mole percent. The carbonization will result in the evolution of a hydrogen halide with halogen-containing precursors. Preferably, flowing inert gas is used at a sufficient rate to remove this material from the particles. However, it has been found that the removal of the hydrogen halide is not necessary to the production of suitable finished material by the subject method.

Prior to the high temperature carbonization mentioned above, the polymer precursor material may preferably be subjected to a mild heating step. Therein, the temperature of the precursor material is raised to a mild heating temperature of at least about 165° C. and preferably to at least about 210° C. over a period of about 10 to 15 hours. The mild heating may occur in a stepped fashion with periods of holding times at intervening temperatures. The precursor material may then be held at the mild heating temperature over a period of about 1.0 to 5.0 hours, or until no more weight loss occurs. The shaped or unshaped precursor material may then be preferably subjected to a stepped temperature increase to a high carbonization temperature of at least about 710° C. and preferably to about 810° C. over a period of about 3.0 to 5.0 hours. As such, the temperature of the precursor material may be raised in temperature at a rate of about 10 to 200° C. per hour. Preferably, it is raised at about 50 to 100° C. per hour. Also, it is desirable to hold the precursor material at the final high carbonization temperature from about 2 to 7 hours and preferably for about 3 to 5 hours. The required holding period can be determined by weight loss measurements, i.e., until no further weight loss occurs.

In a more specific embodiment, for example, where the precursor material is synthesized with lauroyl peroxide as the initiator and pellets are prepared with ground 4–100 microns powder, the carbonization step may include: (1) heating from about 25 to about 165° C. in about 1.4 hours, (2) raising the temperature from about 165 to 175° C. in about 1.6 hours, (3) holding the temperature at about 175° C. for about 3.0 hours, (4) raising the temperature from about 175 to about 185° C. in about 0.8 hours, (5) holding the temperature at about 185° C. for about 3.0 hours, (6) raising the temperature from about 185 to 210° C. in about 0.4 hours, (7) holding the temperature at about 210° C. for about 3.0 hours, (8) raising the temperature from about 210 to 710° C. in about 5.0 hours, (9) holding the temperature at about 710° C. for about 3.0 hours, and (10) lowering the temperature from about 710 to 25° C. in about 1.0 hour.

Figure 2:
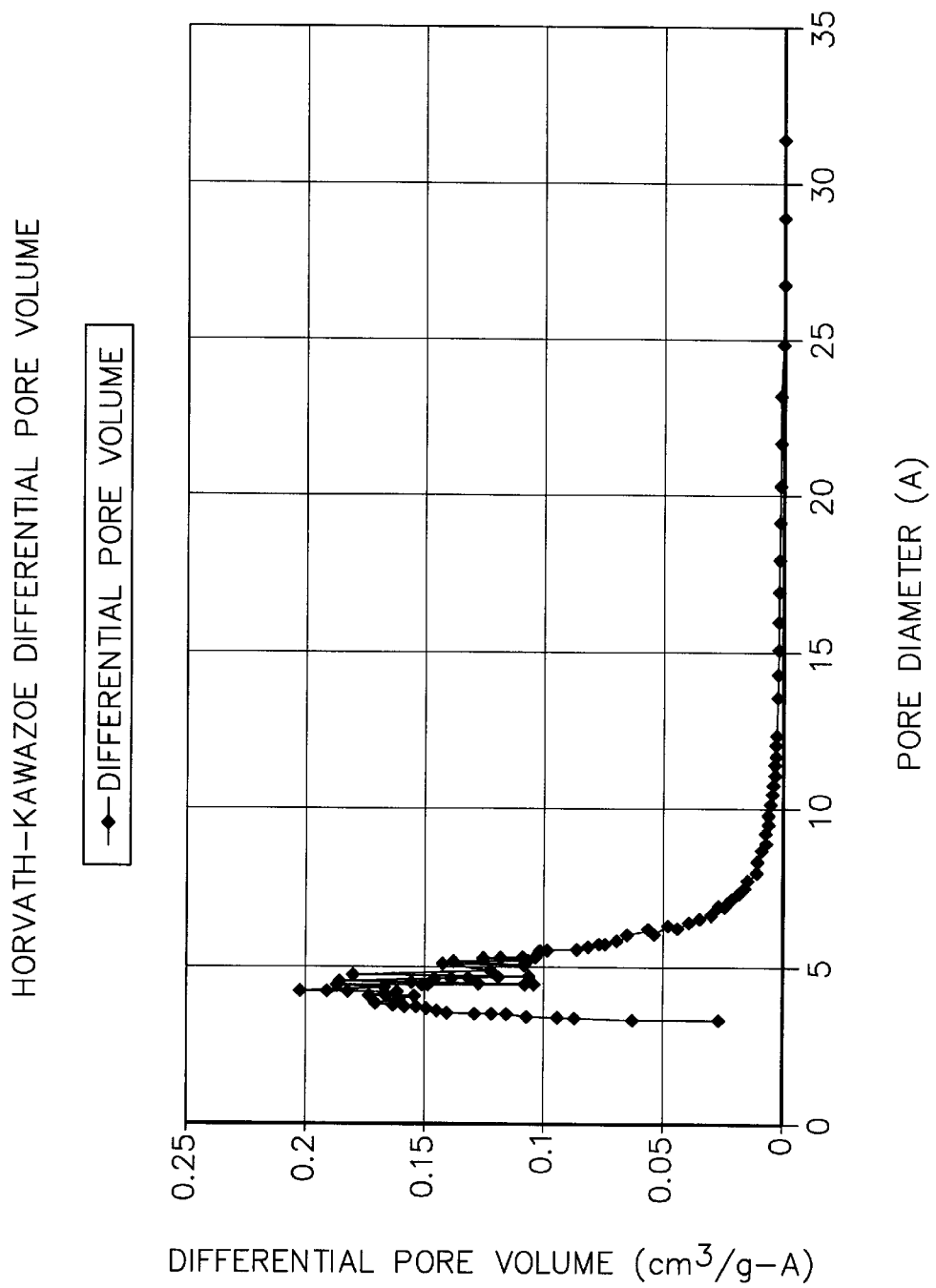
FIG. 2 is a graph of differential pore volume versus pore diameter for carbonized precursor material or carbon molecular sieve (CMS) in accordance with the present invention.

The carbonized precursor material may be characterized by a weight between about 0.005 to 0.010 grams, preferably between about 0.007 to 0.009 grams, and more preferably between about 0007 to 0.008 grams. The weight of the carbonized precursor material can be important due to the advantageous packing density and total pore volume. The carbonized precursor material may also be characterized by a BET surface area between about 1000 to 1500 m$^2$/g, preferably between about 1000 to 1200 m$^2$/g, more preferably between about to 1000 to 1100 m$^2$/g, and specifically at about 1065 m$^2$/g. The carbonized precursor material may have a total pore volume between about 0.4 to 0.6 cm$^3$/g, preferably between about 0.45 to 0.55 cm$^3$/g, more preferably between about 0.5 to 0.53 cm$^3$/g, and specifically about 0.525 cm$^3$/g. A mean pore diameter between about 0.4 to 0.6 nm, preferably between about 0.4 to 0.5 nm, more preferably between about 0.4 to 0.45 nm, and specifically about 0.447 nm may also characterize the carbonized precursor material. This is shown in FIG. 2 which is a graph of differential pore volume versus pore diameter for a preferred embodiment of the carbonized precursor material of the present invention.

A shaped mass of polymeric precursor material can shrink during the carbonization step. The shrinking will tend to occur in a proportional manner along each dimension. The amount of shrinkage is also proportional to the amount of weight loss caused by the driving off of the hydrogen halide from the shaped polymer precursor material. The shaped pellet can lose approximately 70 percent of its weight and size during the carbonization procedure due to the evolution of hydrogen chloride, hydrogen bromide, or hydrogen fluoride or a mixture of these gases.

If no specific shape is desired, the shaping step may be deleted and particles of a desired size may be carbonized, as mentioned above. Alternatively, large masses of polymer may be carbonized and then crushed and sized, such as with screens, although this procedure generally results in the production of considerable waste in the form of off-size particles.

Whether shaped or not, and after the carbonization step described above, the carbonized, precursor material may undergo an activation step or act to produce an activated precursor material or activated CMS (ACMS). This activation step may be performed immediately following the end of the carbonization step without any intermediate cooling or handling of the carbonized material. Alternatively, the carbonized precursor material may be cooled after carbonization and then subjected to a high temperature steaming. The purpose of the activation step is to engineer the pore structure of the carbonized material for a maximum number of adsorption surface sites and thus fast diffusion of carbon dioxide and water in and out of the adsorption sites. Accordingly, the activation step may include increasing the surface area, increasing the total pore volume, increasing the median pore diameter, and/or increasing the pore size distribution of the carbonized precursor material.

Contact with the steam may occur while the carbonized material may be held in a stagnant mass of steam. However, it is preferred that the steam flows through a bed of carbonized precursor material at a flow rate of at least about an 1.0 hr$^{-1}$ liquid hourly space velocity to ensure uniform temperature and contacting. Preferably, the flow rate is between about 1.0 to 3.0 hr$^{-1}$.

In a preferred embodiment, the activation step may include multiple sub-steps of re-contacting the carbonized material with steam at a high temperature, as opposed to a single step. In such multiple sub-steps, the carbonized precursor material may be contacted with steam at least at about 800° C. for at least about 1.5 hours, preferably at about 800 to 900° C. for about 1 to 5 hours, and more preferably at about 800 to 850° C. for about 1.5 to 4.0 hours. Thereafter, the once steam-treated carbonized material from above is re-contacted with steam at least at about 800° C. for at least about 1.5 hours, preferably at about 800 to 900° C. for about 1.0 to 2.0 hours, and more preferably at about 800 to 850° C. for about 1.0 to 1.5 hours. The twice steam-treated carbonized material from above is then re-contacted with steam at least at about 800° C. for at least about 1.0 hour, preferably at about 800 to 900° C. for about 1.0 to 2.0 hours, and more preferably at about 800 to 850° C. for about 1.0 to 1.5 hours. While three sub-steps are described in the foregoing, it can be appreciated that the number of sub-steps can vary.

In a preferred three sub-step activation procedure, the activated CMS may be characterized as shown in the following Table 1:

TABLE 1

| Activation step | Temperature (° C.) | Duration (min) | Yield (%) | Packing density (<12 mesh) | Packing density (12–16 mesh) |
|---|---|---|---|---|---|
| I | 850 | 240 | 26 | 0.308 | 0.247 |
| II | 850 | 90 | 65 | 0.285 | 0.247 |
| III | 850 | 90 | 56 | 0.260 | 0.244 |

Based on the foregoing results, it can be seen that in sub-step I, the carbonized precursor material was activated to a yield of 26% (i.e., 74% of the precursor material was thermally decomposed) with steam at 850° C. for 240 minutes. 8% of the material at 12–16 mesh had a packing density of 0.247 g/ml. In sub-step II, the once steam-treated ACMS at <12 mesh (i.e., 92% of the total ACSM) from sub-step I was reactivated at 850° C. for 90 minutes. This resulted in 20% of the product being in a 12–16 mesh size and having a packing density of 0.247 g/ml. The twice steam-treated material from sub-step II having a mesh <12 was reactivated in sub-step III to produce 80% of the activated CMS within a desired packing density specification of 0.245 g/cm$^3$.

Figure 3:
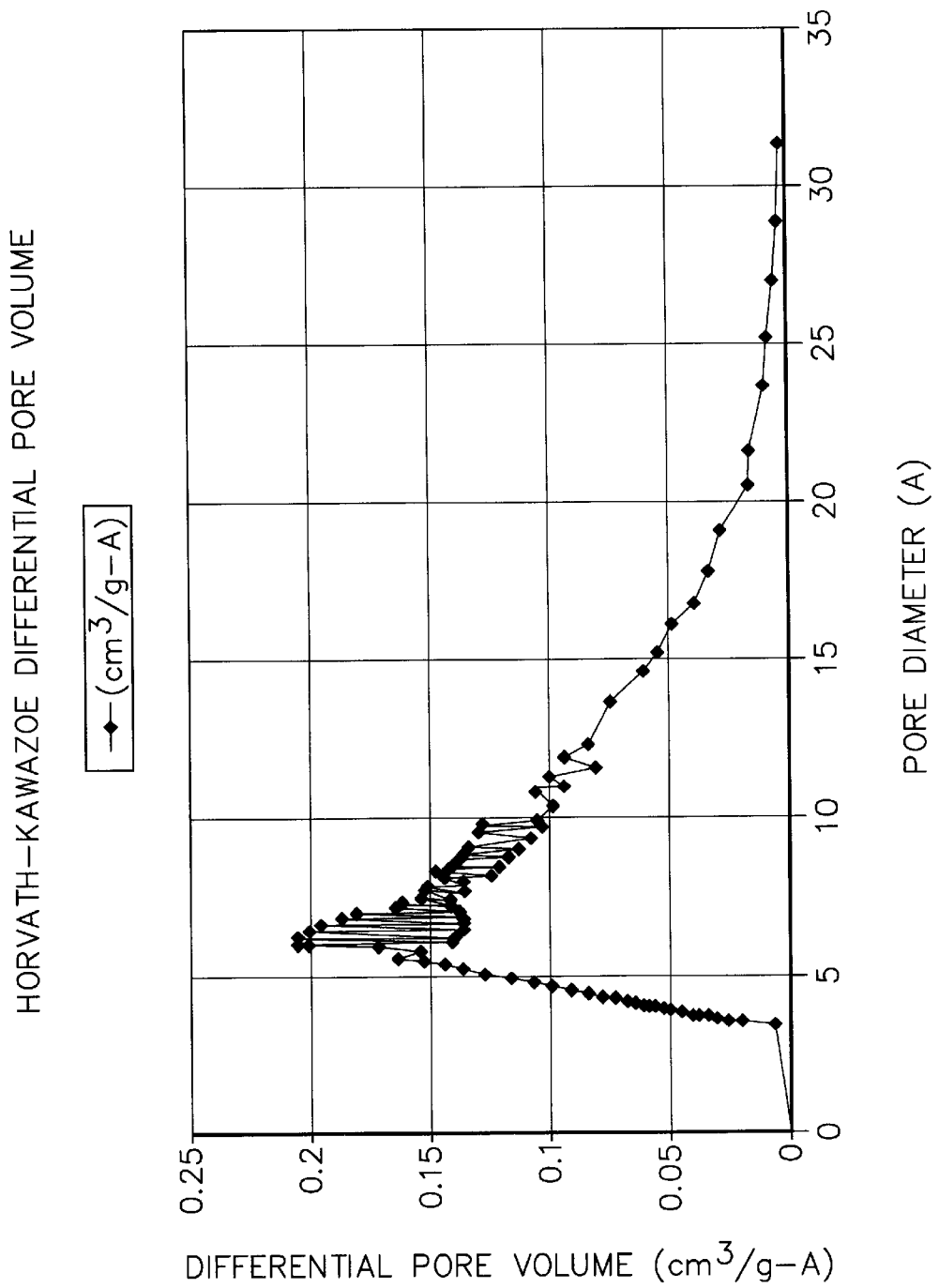
FIG. 3 is a graph of differential pore volume versus pore diameter for activated and carbonized precursor material or activated carbon molecular sieve (ACMS) in accordance with the present invention.

Based on three sub-steps for the activation step, the resulting activated CMS may be characterized by a BET surface area between about 2000 to 2500 m$^2$/g, preferably between about 2000 to 2300 m$^2$/g, more preferably between about 2000 to 2200 m$^2$/g, and specifically about 2183 m$^2$/g. The activated CMS may have a total pore volume between about 1.50 to 2.5 cm$^3$/g, preferably between about 1.7 to 2.2 cm$^3$/g, more preferably between about 1.9 to 2.1 cm$^3$/g, and specifically about 1.98 cm$^3$/g. A mean pore diameter between about 0.5 to 1.2 nm, preferably between about 0.7 to 1.0 nm, more preferably between about 0.85 to 0.95 nm, and specifically about 0.909 nm may also characterize the activated CMS. This is shown in FIG. 3 which is a graph of differential pore volume versus pore diameter for a preferred embodiment of the activated carbonized precursor material of the present invention.

Whether in a single step or multiple sub-steps, the activation step may be characterized by the weight loss of the carbonized precursor material during such activation step. For this embodiment, the weight loss is at least about 78 wt. %, preferably about 60 to 80 wt. %, and more preferably about 75 to 80 wt. %. Weight loss in excess of about 80 wt. % may occur by the removal of carbon and may lead to destruction of the structure of the carbon skeleton particle and its collapse into finer particles or powder. Accordingly, the activated CMS is characterized by a weight of at least about 0.0018 grams, preferably about 0.0015 to 0.0020 grams, and more preferably about 0.0017 to 0.0019 grams.

After the activation step, the activated and carbonized precursor material may undergo a functionalizing step that produces a functionalized CMS or functionalized adsorbent. The functionalizing step serves to create first functional sites, as well as second functional sites, for the adsorption of carbon dioxide and water. However, and in contrast to the prior art, the present invention provides such first and second functional sites such that they respectively enable carbon dioxide adsorption independently of water adsorption. Thereby, the carbon dioxide and water do not compete for adsorption at the first and second functional sites.

In carrying out the functionalizing step, amine functional groups may be incorporated into the micropores of the surface of the activated and carbonized precursor material. Any suitable amine compound(s) which results in the placement of the amine compound on the precursor material can be employed. Useful amines include methylamine, ethyl amine, isopropyl amine, dipropylamine and phenylenediamine or mixtures of these compounds. Preferred functionalization agents include mono or dihydric amino alcohols such as mono or diethanolamine (MEA or DEA), isopropanolamine, methanolamine, diisopropanolamine, or methylethylanolamine, etc. It is believed that tertiary amines are not best for use in the subject process as it is believed that the linkage of the amine to the carbonized precursor material is via the nitrogen atom. Secondary amines are preferred, including an alcohol amine such as diethanol amine.

The functionalization agent can be applied by a number of methods such as by immersing the activated and carbonized precursor material in a liquid or by exposure to a mist or vapor. The preferred method is by exposure to an agitated mass, that is, a mass of activated and carbonized precursor particles being stirred or tumbled is exposed to a mist of the functionalization agent by being continuously sprayed through a nozzle or other means of generating very fine droplets which fall or impact on the precursor material. This mode of contacting can be performed at ambient conditions of temperature and pressure.

The amount of functionalization agent added to the carbonized and activated precursor material may be about 80 to 150 wt. %, preferably about 90 to 140 wt. %, and more preferably about 100 to 130 wt. %. The resulting functionalized CMS may be characterized by the functionalized agent being present at about 45 to 60 wt. %, preferably about 47 to 58 wt. %, and more preferably about 50 to 57 wt. %.

Figure 10:
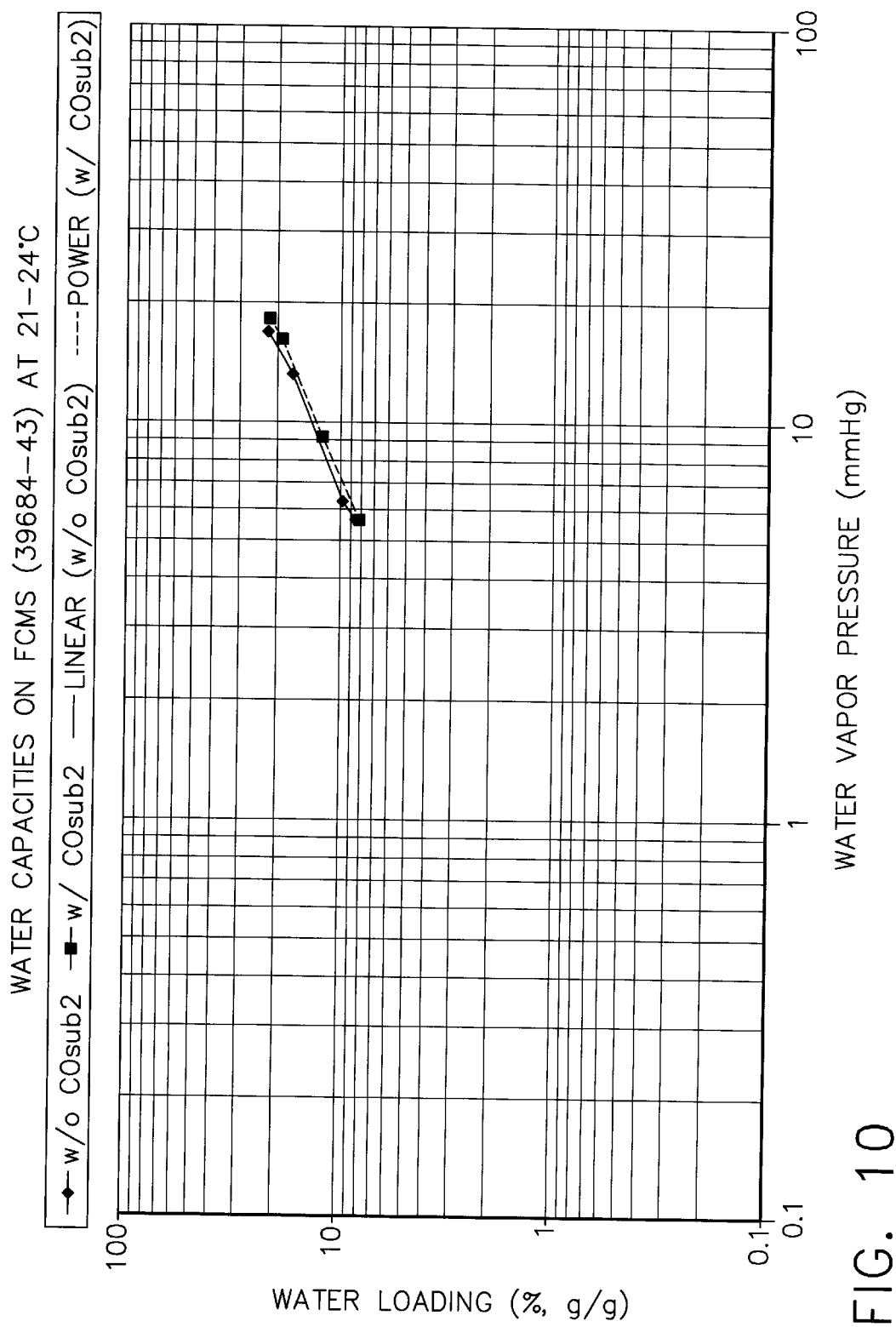
FIG. 10 is a graph of water loading versus water vapor pressure during adsorption for functionalized ACMS in accordance with the present invention.
Figure 11:
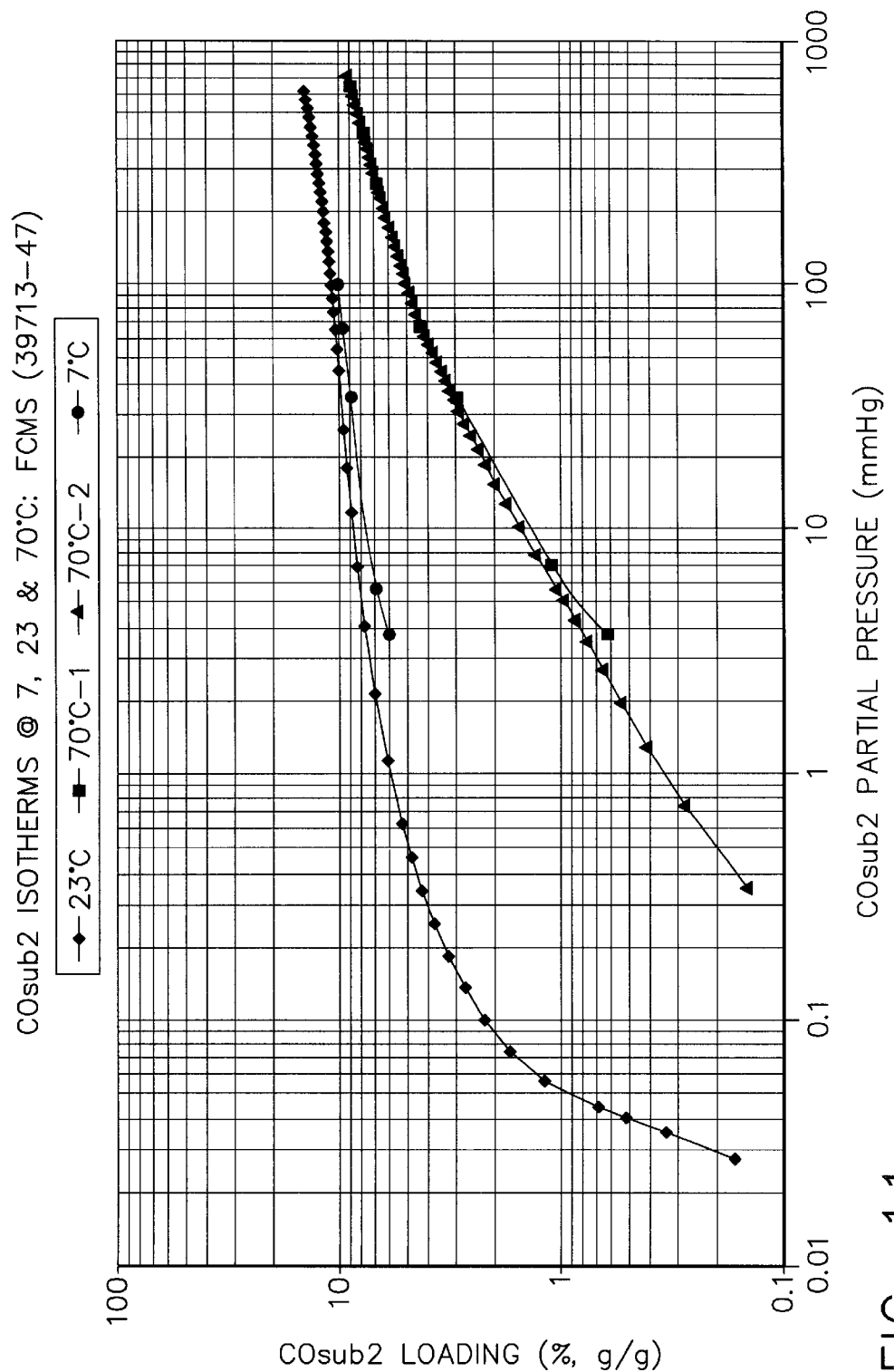
FIG. 11 is a graph of $CO_2$ loading versus $CO_2$ partial pressure during adsorption for functionalized ACMS in accordance with the present invention.

As a consequence of the foregoing steps, the final CMS or adsorbent of the present invention has a carbon dioxide adsorption capacity—at a temperature between about 15 to 25° C. and a pressure between about 3 to 4 mm Hg—of at least about 4% and extending up to about 6% (wt./wt.). At such temperature and pressure, the adsorbent also has a water adsorption capacity of at least about 10% and extending up to about 30% (wt./wt.). This is depicted in FIGS. 10 and 11 which are water and $CO_2$ adsorption isotherms respectively-measured for adsorbent of the present invention.

The bifunctional nature of the CMS prepared according to the present invention allows carbon dioxide removal to be achieved without the prior passage of air being treated for the removal of normally expected amounts of water vapor. Carbon dioxide removal from air may be accomplished by passing the air at a slight pressure or at an ambient pressure through an active bed of the CMS and at adsorption-promoting conditions. Two or more beds may be employed on a swing bed system to provide continuous removal of carbon dioxide. The adsorbed carbon dioxide may then be recovered from the CMS by conventional means such as by depressurization, heating, or a combination of these two methods which regenerates the material and returns it to an active or unsaturated form.

EXAMPLE 1

For the synthesis of a PVDC precursor, an aqueous solution was prepared by dissolving 50.0 g of Methocel (hydroxypropyl methyl cellulose) in 101,070 g of DI water in a 50-gallon reactor. A catalyst initiator solution was prepared by dissolving 102.2 g of lauroyl peroxide in one liter of VDC (inhibitor removed). The initiator solution and additional VDC (inhibitor removed) was prepared to have a total of 40,870 grams of VDC mixed with the aqueous solution in the 50-gallon reactor with a mixer maintained at 75 rpm.

A reaction temperature program described above was used. A total of 39,662 grams of PVDC with particle sizes ranging from 40 to 500 micrometers was obtained (FIG. 1).

EXAMPLE 2

For the pelletization and shaping of the PVDC powder, the PVDC precursor produced as described in Example 1 was ground in a liquid suspension. 520 grams of PVDC were first mixed with 300 ml of DI water and ground for 20 minutes. A cooling time of 20 minutes was used and then 150 ml of ice were added to the mixture and ground for another 20 minutes. The process was repeated for a total of 8 times. After a total grinding of 180 minutes, the mixture was dried in air. This resulted in a narrow particle size distribution of 4–100 micrometers (FIG. 1). The fine powder was pelletized in a commercial pelletization unit to the following geometry and piece density shown in Table 2:

TABLE 2

Precursor Pellet

| Pellet # | Diameter (mm) | Length (mm) | Weight (g) | Density (g/cm³) |
|---|---|---|---|---|
| 1 | 3.29 | 3.50 | 0.0356 | 1.10 |
| 2 | 3.30 | 3.44 | 0.0310 | 1.05 |
| 3 | 3.26 | 3.28 | 0.0300 | 1.10 |
| 4 | 3.26 | 3.30 | 0.0322 | 1.17 |
| 5 | 3.23 | 3.12 | 0.0305 | 1.19 |
| 6 | 3.24 | 3.16 | 0.0298 | 1.14 |
| 7 | 3.30 | 3.30 | 0.0314 | 1.11 |
| 8 | 3.19 | 3.29 | 0.0304 | 1.16 |
| 9 | 3.22 | 3.23 | 0.0315 | 1.20 |
| 10 | 3.21 | 3.39 | 0.0299 | 1.09 |
| Average | 3.25 | 3.30 | 0.0312 | 1.13 +/- 0.05 |

EXAMPLE 3

Following the general procedures of Example 2, additional grinding and pelletization efforts were conducted with the PVDC powder produced as described in Example 1. The geometry and piece density of the precursor pellets is shown in Table 3.

TABLE 3

Precursor Pellet

| Pellet # | Diameter (mm) | Length (mm) | Weight (g) | Density (g/cm³) |
|---|---|---|---|---|
| 1 | 3.27 | 3.15 | 0.0293 | 1.11 |
| 2 | 3.31 | 3.21 | 0.0299 | 1.08 |
| 3 | 3.24 | 3.12 | 0.0308 | 1.20 |
| 4 | 3.29 | 3.50 | 0.0295 | 0.99 |
| 5 | 3.22 | 3.21 | 0.0290 | 1.11 |
| 6 | 3.28 | 3.04 | 0.0303 | 1.18 |
| 7 | 3.27 | 3.40 | 0.0311 | 1.09 |
| 8 | 3.29 | 3.30 | 0.0309 | 1.10 |
| 9 | 3.30 | 3.21 | 0.0257 | 0.93 |
| 10 | 3.21 | 3.25 | 0.0306 | 1.15 |
| Average | 3.27 | 3.24 | 0.0302 | 1.09 +/- 0.08 |

EXAMPLE 4

The PVDC precursor pellets prepared as described in Example 3 were carbonized in a Lindberg tubular furnace. A quartz boat, 6 cm wide and 35 cm long, was placed in a quartz tube of 7 cm diameter. A total of 265.7 grams of the PVDC pellets were carbonized in a flow of nitrogen at a flow rate of 630 cm³/min. A temperature program was followed as shown below:

1. 25 to 165° C. in 1.4 hours;
2. 165 to 175° C. in 1.6 hours;
3. 175° C. held for 3.0 hours;
4. 175 to 185° C. in 0.8 hour;
5. 185° C. held for 3.0 hours;
6. 185 to 210° C. in 0.4 hour;
7. 210° C. held for 3.0 hours;
8. 210 to 710° C. in 5.0 hours;
9. 710° C. held for 3.0 hours;
10. 710 to 25° C. in 1 hour.

After the temperature was cooled down, 69.0 grams of carbon molecular sieve were obtained. The geometry and piece density of the carbon molecular sieve is shown below in Table 4:

TABLE 4

Carbonized Precursor Pellet

| Pellet # | Diameter (mm) | Length (mm) | Weight (g) | Density (g/cm³) |
|---|---|---|---|---|
| 1 | 2.20 | 2.21 | 0.0078 | 0.928 |
| 2 | 2.26 | 2.37 | 0.0083 | 0.873 |
| 3 | 2.26 | 2.37 | 0.0085 | 0.894 |
| 4 | 2.20 | 2.50 | 0.0086 | 0.905 |
| 5 | 2.25 | 2.37 | 0.0078 | 0.828 |
| 6 | 2.21 | 2.17 | 0.0075 | 0.901 |
| 7 | 2.22 | 2.04 | 0.0077 | 0.975 |
| 8 | 2.20 | 2.32 | 0.0077 | 0.873 |
| 9 | 2.21 | 2.20 | 0.0073 | 0.865 |
| 10 | 2.21 | 2.30 | 0.0079 | 0.895 |
| Average | 2.22 | 2.29 | 0.0079 | 0.904 +/- 0.044 |

EXAMPLE 5

Following the general procedure of Example 4, PVDC pellets prepared as described in Example 3 were carbonized in another Lindberg tubular furnace that had a 3-zone heating capability. 186.64 grams of PVDC pellets were kept in a quartz boat 5-cm wide and 27 cm long. At a nitrogen flow rate of 1360 cm³/min, a temperature program similar to that of Example 4 was used. At the end of the heating program, 48.48 grams of carbon molecular sieve were obtained with the following geometry and piece density:

TABLE 5

Carbonized Precursor Pellets

| Pellet # | Diameter (mm) | Length (mm) | Weight (g) | Density (g/cm³) |
|---|---|---|---|---|
| 1 | 2.27 | 2.39 | 0.0081 | 0.837 |
| 2 | 2.23 | 2.15 | 0.0075 | 0.893 |
| 3 | 2.20 | 2.39 | 0.0083 | 0.914 |
| 4 | 2.27 | 2.00 | 0.0073 | 0.902 |
| 5 | 2.21 | 2.26 | 0.0081 | 0.934 |
| 6 | 2.20 | 2.27 | 0.0075 | 0.869 |
| 7 | 2.20 | 2.41 | 0.0083 | 0.906 |
| 8 | 2.20 | 1.97 | 0.0072 | 0.961 |
| 9 | 2.20 | 2.36 | 0.0081 | 0.903 |
| 10 | 2.21 | 2.09 | 0.0073 | 0.911 |
| Average | 2.20 | 2.23 | 0.0078 | 0.903 +/- 0.034 |

EXAMPLES 6–13

Following a general procedure of Example 4, a number of carbonization runs were conducted in the laboratory. Results of some of these runs are summarized as shown in Table 6.

TABLE 6

Carbonized Precursor Pellets

| Example | PVDC pellets (grams) | CMS product (grams) | Carbonization yield (%) |
|---|---|---|---|
| 4 | 265.7 | 69.0 | 25.97 |
| 6 | 289.6 | 75.9 | 26.21 |
| 7 | 290.6 | 76.2 | 26.23 |
| 8 | 291.1 | 76.5 | 26.28 |
| 9 | 290.2 | 75.5 | 26.02 |
| 10 | 195.5 | 51.4 | 26.29 |
| 11 | 272.1 | 70.8 | 26.02 |
| 12 | 292.8 | 76.5 | 26.12 |
| 13 | 284.8 | 74.6 | 26.19 |

The yield refers to the amount of material remaining following carbonization that results in thermal decomposition.

EXAMPLES 14–21

Following a general procedure of Example 5, a number of carbonization runs were conducted in the laboratory. Results of some of these runs are summarized as shown in Table 7.

TABLE 7

Carbonized Precursor Pellet

| Example | PVDC pellets (grams) | CMS product (grams) | Carbonization yield (%) |
|---|---|---|---|
| 5 | 186.64 | 48.48 | 25.98 |
| 14 | 257.1 | 67.3 | 26.18 |
| 15 | 283.0 | 73.6 | 26.01 |
| 16 | 263.2 | 67.7 | 25.72 |
| 17 | 273.6 | 71.5 | 26.13 |
| 18 | 266.7 | 69.6 | 26.10 |
| 19 | 253.4 | 66.0 | 26.05 |
| 20 | 209.9 | 54.6 | 26.01 |
| 21 | 188.8 | 49.7 | 26.32 |

EXAMPLE 22

The CMS materials prepared from Examples 4 and 6–13 were activated in the tubular furnace used in Example 4. 151.9 grams of CMS were contained in a quartz boat of 6-cm wide and 35-cm long that was placed in a quartz tube of 7-cm diameter in the middle of the tube furnace. In a flow of nitrogen at a flow rate of 630 cm$^3$/min, the temperature of the furnace was raised to 850° C. at a heating rate of 100° C. per hour. At 850° C., water steam at a flow rate of 0.75 liters per minute was introduced. The activation lasted for 4 hours. After the activation, 37.5 grams of activated carbon molecular sieve were obtained (75.3% weight loss). Among the ACMS obtained, 3.9 grams had a US mesh size between 12 and 16 mesh. This portion (10.5%) had a packing density of 0.244 grams per cm$^3$. The remainder (33.6 grams, 89.5%) had <US mesh size of 12 and had a packing density of 0.311 grams per cm$^3$.

EXAMPLE 23

Following the general procedure described in Example 22, 141.4 grams of CMS produced from a procedure described in Example 4 were activated at 850° C. for 4 hours. 35.5 grams of activated carbon molecular sieve (74.9% weight loss) were obtained. Among the ACMS obtained, 3.8 grams (10.7%) were in the mesh 12–16 group, having a packing density of 0.247 grams/cm$^3$. The other portion was less than 12 US mesh size and had a packing density of 0.308 grams/cm$^3$.

EXAMPLE 24

Following the general procedure of Example 22, portions of ACMS produced in Examples 23 and 24 with particle sizes larger than 12 mesh were combined and reactivated in steam at 850° C. for 1.5 hours. 40.4 grams of ACMS were obtained (38% weight loss). Two portions, one less than 12 mesh and the other in the 12–16 mesh size, were obtained, with the 12–16 mesh size at 21.2% of the total. The 12–16 mesh size portion had a packing density of 0.246 grams/cm$^3$. The other portion (32 grams, packing density of 0.279 grams/cm$^3$) was reactivated again in steam at 850° C. for an additional 1.5 hours. At the end of this reactivation, 19.1 grams (88.1%) of ACMS of 12–16 mesh size at a packing density of 0.247 grams/cm$^3$ were obtained.

This 3-step process described in Examples 22–24 for the activation of CMS is summarized in Table 8.

TABLE 8

Activated CMS

| Activation step | Temperature (° C.) | Duration (mm) | Yield (%) | Packing density (<12 mesh) | Packing density (12–16 mesh) |
|---|---|---|---|---|---|
| I | 850 | 240 | 25 | 0.308 | 0.247 |
| II | 850 | 90 | 62 | 0.280 | 0.246 |
| III | 850 | 90 | 55 | 0.264 | 0.247 |

EXAMPLE 25

Following the 3-step process described in Examples 22–24 for the activation of CMS. CMS samples prepared as described in Examples 6–13 were activated. Results of the activation are illustrated in Table 9.

TABLE 9

Activated CMS

| Activation step | Temperature (° C.) | Duration (mm) | Yield (%) | Packing density (<12 mesh) | Packing density (12–16 mesh) |
|---|---|---|---|---|---|
| I | 850 | 240 | 28 | 0.305 | 0.248 |
| II | 850 | 90 | 64 | 0.275 | 0.247 |
| III | 850 | 90 | 57 | 0.265 | 0.245 |

EXAMPLE 26

The 3-step process described in Examples 22–24 for the activation of CMS was followed. CMS samples prepared as described in Examples 14–21 were activated. Results of the activation are illustrated in Table 10.

TABLE 10

Activated CMS

| Activation step | Temperature (° C.) | Duration (mm) | Yield (%) | Packing density (<12 mesh) | Packing density (12–16 mesh) |
|---|---|---|---|---|---|
| I | 850 | 240 | 30 | 0.279 | 0.228 |
| II | 850 | 100 | 64 | 0.256 | 0.243 |
| III | 850 | 75 | 71 | 0.243 | 0.247 |

EXAMPLE 27

The activated carbon molecular sieve was functionalized with dihydric alcohol amine. 50.8 grams of ACMS were exposed to a stream of atomized mist of the alcohol amine for several seconds at a time. After the exposure, the ACMS was shaken and mixed for 5–10 minutes. The process was repeated for 15 to 20 times until a total of 61.0 grams of the alcohol amine were incorporated to the ACMS.

EXAMPLE 28

Following the general procedure of Example 27, 114.2 grams of ACMS prepared as described in Examples 22–24 were exposed to dihydric alcohol amine. A total of 139.5 grams of the alcohol amine were incorporated into the structure of ACMS.

EXAMPLE 29

Figure 4:
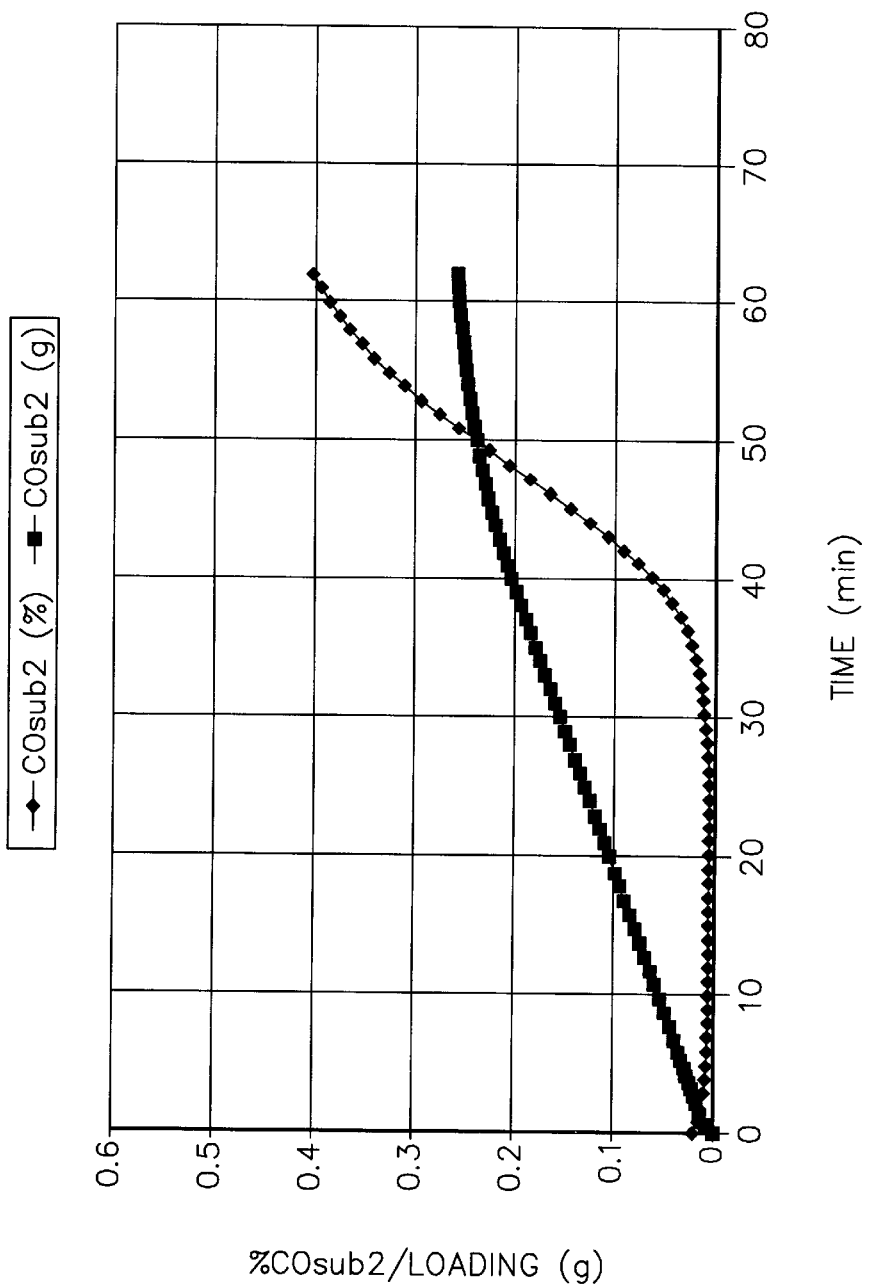
FIG. 4 is a graph of % $CO_2$ loading versus time for functionalized ACMS in the absence of humidity in accordance with the present invention.

The adsorbent prepared as described in Example 27 was tested for its selective removal of $CO_2$ and water vapor from air in a test unit. The test unit consists of a test bed of 1.4-cm ID and an adsorbent volume of 9 cm³, a flow monitor, a $CO_2$ monitor and a humidity sensor. With a $CO_2$ feed of 0.51% $CO_2$ in air and a feed flow rate of 550 cm³/min (residence time of 0.98 seconds), the effluent $CO_2$ concentration reached 0.4% in 62 minutes as shown in FIG. 4. At this point, the feed was shut down, a $CO_2$ weight gain of 0.261 grams was measured. This corresponds to a $CO_2$ capacity of 5.63% (wt./wt.).

EXAMPLE 30

Figure 5:
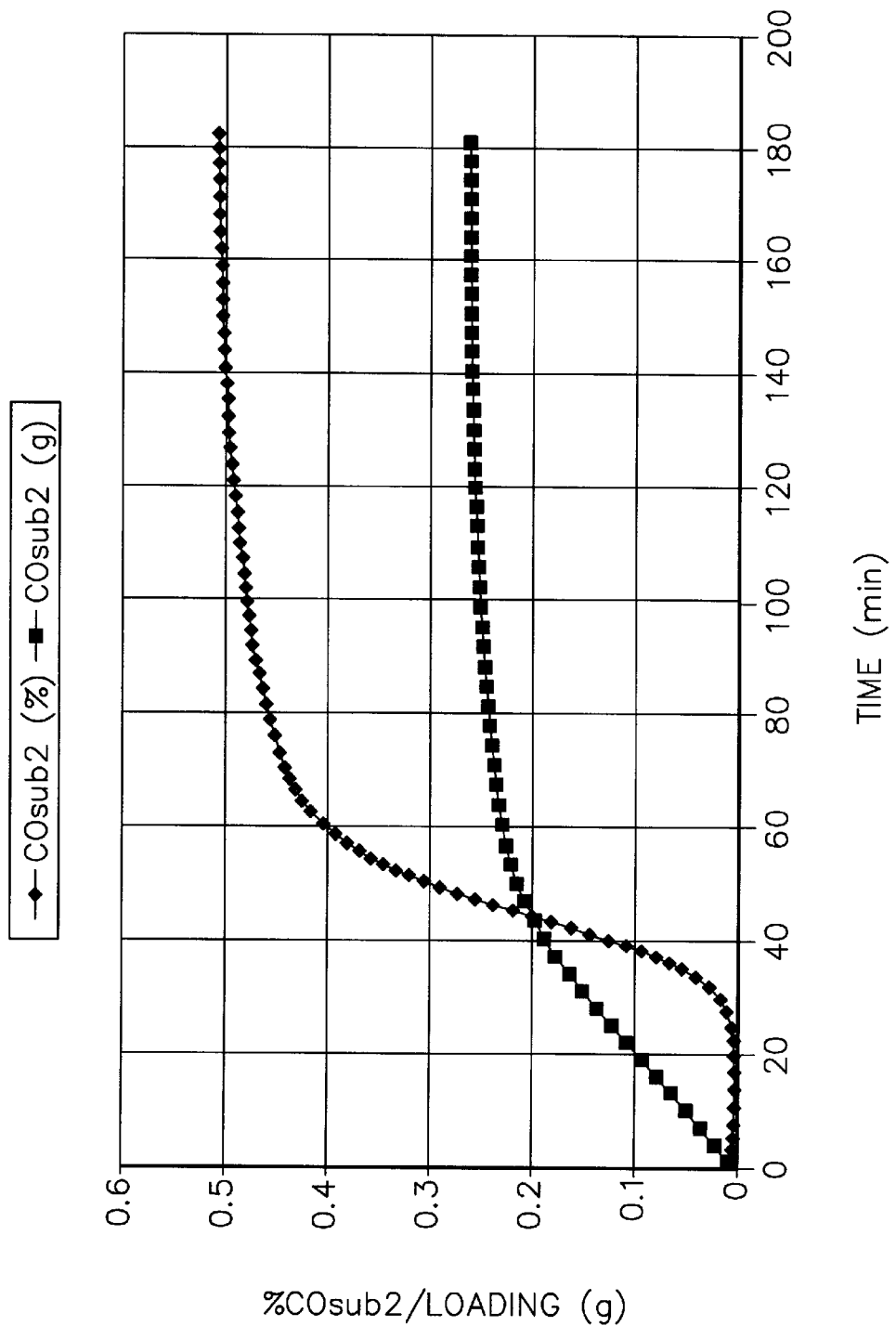
FIG. 5 is a graph of % $CO_2$ loading versus time for functionalized ACMS in the presence of humidity in accordance with the present invention.
Figure 6:
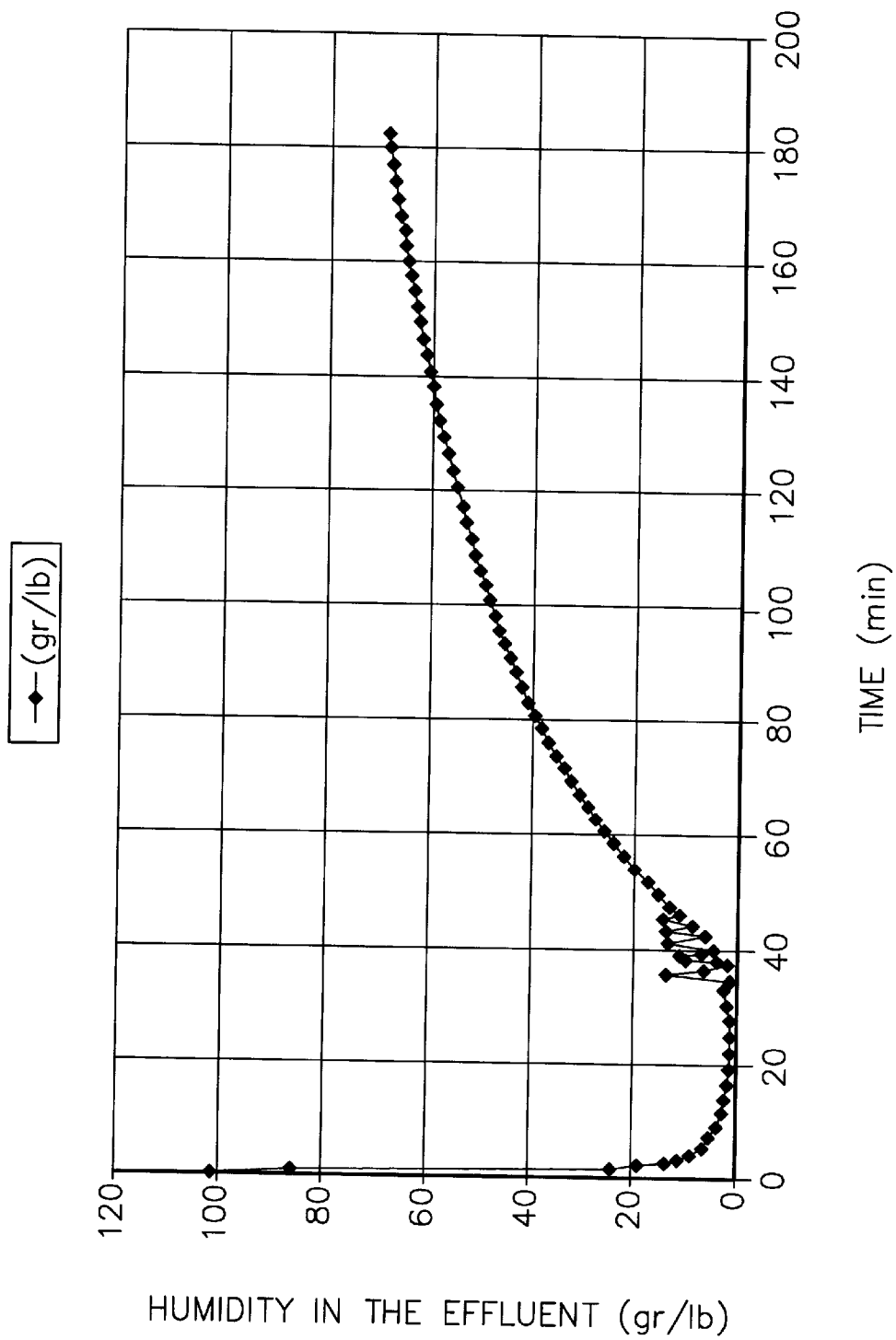
FIG. 6 is a graph of humidity in effluent versus time for the functionalized ACMS shown in FIG. 5 in accordance with the present invention.

Following the general procedure of Example 29, a humidified feed containing 0.51% of $CO_2$ and a humidity of 102.2 grains/pound was used to evaluate the effect of humidity on the $CO_2$ capacity of the adsorbent described in Example 27. A $CO_2$ breakthrough curve is shown in FIG. 5 and the humidity in the effluent is illustrated in FIG. 6.

At the end of 3 hours, the effluent $CO_2$ concentration was the same as the feed concentration. A total of 1.678 grams of $CO_2$ and water were removed from the feed gas mixture. The integration of the $CO_2$ curve showed an uptake of 0.268 grams of $CO_2$. This was used to calculate the weight of water, 1.417 grams, loaded on the adsorbent. This example shows that the adsorbent prepared according to the present invention removes both $CO_2$ and water from air. The presence of water in air does not affect the capability of the adsorbent for the removal of $CO_2$.

Following the general procedure of the above breakthrough test, a series of tests were further conducted to evaluate the effect of humidity on the adsorption capacity of the adsorbent for the removal of carbon dioxide. The adsorbent prepared according to Example 27 was first loaded with water by passing a humidified nitrogen stream through the test bed. The humidity of the stream was controlled by controlling the evaporator temperature with a constant temperature bath. At a flow rate of 550 cm³/min and after 3 hours, the feed was switched to 0.51% $CO_2$ in air and humidified with the same humidity. The $CO_2$ uptake per 9 ml of the adsorbent was monitored by the integration of the $CO_2$ concentration in the effluent until a complete breakthrough was achieved. Results of these tests are summarized in Table 10. These data show that the relative humidity in air does not significantly affect the capability of the adsorbent prepared according to the present invention.

TABLE 10

Humidity Effects on Functionalized CMS

| Relative humidity (%) | Water vapor pressure (mmHg) | $CO_2$ capacity with 0.51% $CO_2$ in the humidified air |
|---|---|---|
| 0 | 0 | 0.268 grams |
| 31.4 | 5.848 | 0.275 |
| 50.7 | 9.458 | 0.260 |
| 68.3 | 13.634 | 0.260 |
| 82.7 | 17.430 | 0.260 |
| 84.8 | 18.422 | 0.261 |

EXAMPLE 31

Figure 7:
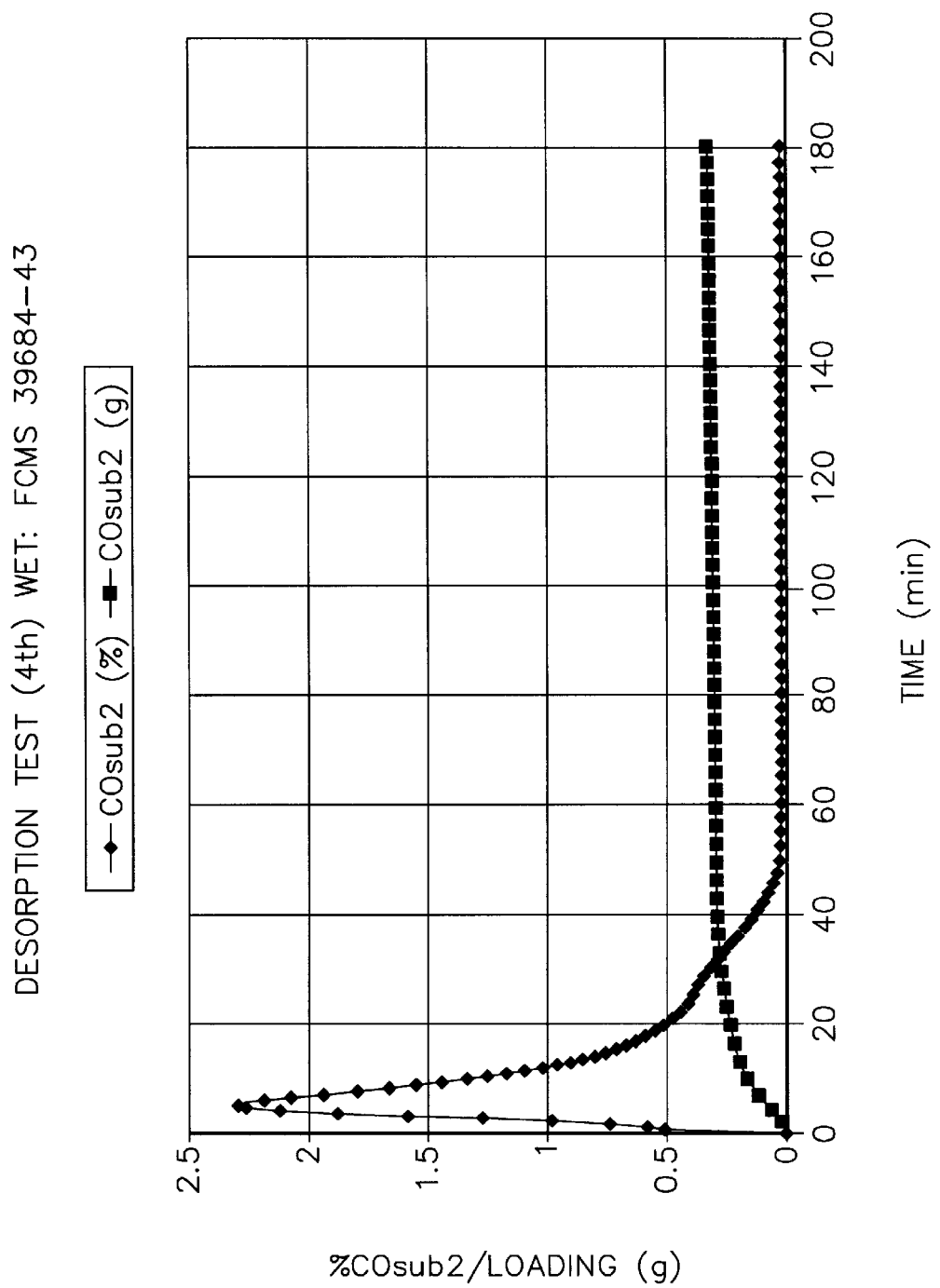
FIG. 7 is a graph of % $CO_2$ loading versus time during desorption for functionalized ACMS in accordance with the present invention.
Figure 8:
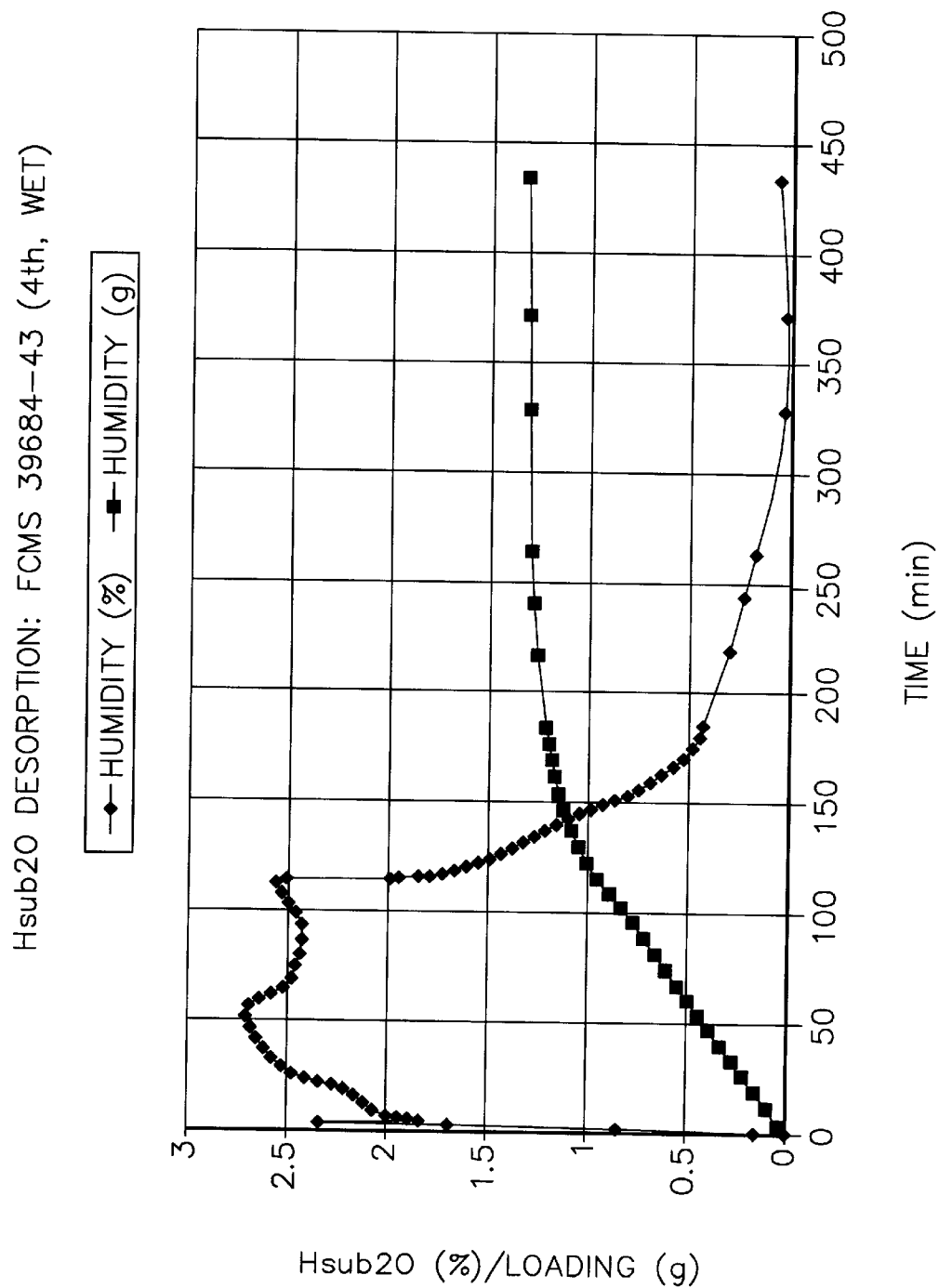
FIG. 8 is a graph of % $H_2O$ loading versus time during desorption for functionalized ACMS in accordance with the present invention.
Figure 9:
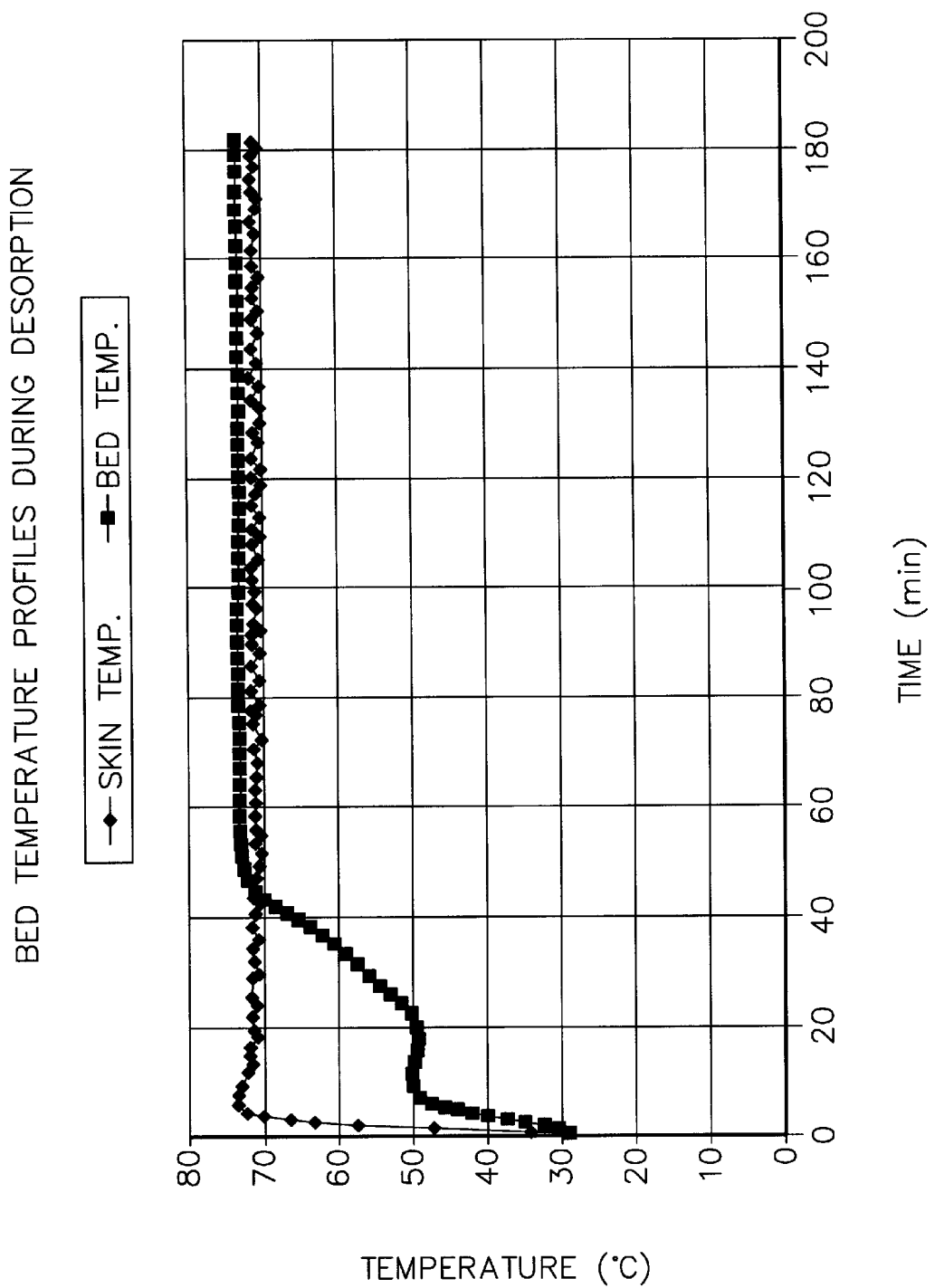
FIG. 9 is a graph of bed temperature versus time during desorption for functionalized ACMS in accordance with the present invention.

The adsorbent loaded with $CO_2$ and water as described in Example 30 was regenerated with heat while purging with dry nitrogen. 6.293 grams of the adsorbent loaded with 0.268 grams of $CO_2$ and 1.417 grams of $H_2O$ were heated to 70° C. with a stream of nitrogen at a flow rate of 550 cm³/min. The desorption of $CO_2$ is illustrated in FIG. 7 while the removal of water is shown in FIG. 8. As shown in these figures, $CO_2$ was completely desorbed after 60 minutes, and a complete desorption of $H_2O$ takes longer than 250 minutes under the condition used. The temperature profiles of the test bed, with a thermocouple next to the bed wall (skin temperature) and another thermocouple in the center of the bed (bed temperature), are reproduced in FIG. 9.

It should be understood, of course, that the foregoing relates to preferred embodiments of the invention and that modifications may be made without departing from the spirit and scope of the invention as set forth in the following claims.

We claim:

1. A carbon dioxide and water adsorbent, comprising:
   an adsorbent material having first functional sites that adsorb said carbon dioxide and second functional sites that adsorb said water, wherein adsorption of said carbon dioxide by said first functional sites is independent of adsorption of said water by said second functional sites, said adsorbent material being characterized by a weight between about 0.0015 to 0.0020 grams, and a packing density between about 0.228 to 0.247 g/cm³.

2. The adsorbent of claim 1, wherein said adsorbent material is further characterized by a total pore volume of between about 1.50 to 2.50 cm³/g.

3. The adsorbent of claim 1, wherein said adsorbent material is further characterized by a median pore diameter between about 0.5 to 1.2 nm.

4. The adsorbent of claim 1, wherein said adsorbent material is further characterized by a BET surface area between about 2000 to 2500 m²/g.

5. The adsorbent of claim 1, wherein said adsorbent material is characterized by a carbon dioxide adsorption capacity between about 4 to 6 wt./wt. % at a temperature of about 15 to 25° C. and a pressure of about 3 to 4 mm Hg.

6. The adsorbent of claim 1, wherein said adsorbent material is characterized by a water adsorption capacity between about 10 to 30 wt./wt. % at a temperature of about 15 to 25° C. and a pressure of about 7 to 25 mm Hg.

7. A carbon dioxide and water adsorbent, comprising:
   an adsorbent material having first functional sites that adsorb said carbon dioxide and second functional sites that adsorb said water,
   wherein said adsorbent material is characterized by a total pore volume of between about 1.50 to 2.50 cm³/g, a median pore diameter between about 0.5 to 1.2 nm, and a BET surface area between about 2000 to 2500 m²/g.

8. The adsorbent of claim 7, wherein said first functional sites provide adsorption independently of adsorption by said second functional sites.

9. The adsorbent of claim 7, wherein said first and second functional sites comprise an amine group.

10. The adsorbent of claim 7, wherein said adsorbent material is formed from a precursor material, said precursor material characterized by a diameter between about 0.1 to 0.2 inches.

11. The adsorbent of claim 7, wherein said adsorbent material is formed from a precursor material, said precursor material characterized by a length between about 0.1 to 0.3 inches.

12. The adsorbent of claim 7, wherein said adsorbent material is further characterized by a weight between about 0.0015 to 0.0020 grams.

13. The adsorbent of claim 7, wherein said adsorbent material is further characterized by a packing density of between about 0.228 to 0.247 g/cm³.

14. The adsorbent of claim 7, wherein said adsorbent material is further characterized by a total pore volume of between about 1.7 to 2.2 cm³/g.

15. The adsorbent of claim 7, wherein said adsorbent material is further characterized by a median pore diameter between about 0.7 to 1.0 nm.

16. The adsorbent of claim 7, wherein said adsorbent material is further characterized by a BET surface area between about 2000 to 2300 m$^2$/g.

17. A method of making a carbon dioxide and water adsorbent, comprising:

polymerizing a monomer to produce a precursor material;

carbonizing said precursor material to produce a carbonized precursor material;

activating said carbonized precursor material to produce an adsorbent material; and functionalizing said adsorbent material by exposing said adsorbent material to an amine, said adsorbent material having first and second functional sites, wherein adsorption of said carbon dioxide by said first functional sites is independent of adsorption of said water by said second functional sites;

and wherein said adsorbent material is characterized by a carbon dioxide adsorption capacity between about 4 to 6 wt./wt. %, as well as a water adsorption capacity between about 10 to 30 wt/wt %, at a pressure of about 3 to 4 mm Hg for carbon dioxide, 7 to 25 mm Hg for water, and a temperature of about 15 to 25° C.

18. The method of claim 17, wherein said precursor material provided by said polymerizing step is characterized by a diameter between about 0.1 to 0.2 inches.

19. The method of claim 17, wherein said precursor material provided by said polymerizing step is characterized by a length between about 0.1 to 0.3 inches.

20. The method of claim 17, wherein said carbonized precursor material provided by said carbonizing step is characterized by a weight between about 0.005 to 0.010 grams.

21. The method of claim 17, wherein said carbonized precursor material provided by said carbonizing step is characterized by a piece density between about 0.828 to 0.975 g/cm$^3$.

22. The method of claim 17, wherein said adsorbent material is further characterized by a total pore volume between about 1.50 to 2.50 cm$^3$/g.

23. The method of claim 17, wherein said adsorbent material is further characterized by a median pore diameter between about 0.5 to 1.2 nm.

24. The method of claim 17, wherein said adsorbent material is further characterized by a BET surface area between about 2000 to 2500 m$^2$/g.

25. The adsorbent of claim 1, wherein said adsorbent material comprises between about 45 to 60 wt. % of an amine.

26. The method of claim 17, wherein said activating step comprises a multi-step process wherein said carbonized precursor material is repeatedly exposed to steam at a temperature of between about 800 to 900° C.

* * * * *